July 24, 1934.　　　G. F. HOUSTON　　　1,967,407
BRAKE
Filed Nov. 7, 1929　　　2 Sheets-Sheet 1

INVENTOR.
GEORGE F. HOUSTON
BY
ATTORNEY

July 24, 1934. G. F. HOUSTON 1,967,407
BRAKE
Filed Nov. 7, 1929 2 Sheets-Sheet 2

INVENTOR.
GEORGE F. HOUSTON
BY M.W. McConkey
ATTORNEY

Patented July 24, 1934

1,967,407

UNITED STATES PATENT OFFICE 1,967,407

BRAKE

George F. Houston, South Bend, Ind., assignor to Bendix Brake Company, South Bend, Ind., a corporation of Illinois Application November 7, 1929, Serial No. 405,324

16 Claims. (Cl. 188—78)

This invention relates to brakes and is illustrated as embodied in an internal expanding brake suitable for use on automobiles.

One object of the invention is to provide more efficient operating and adjusting mechanisms for the brakes.

Another object of the invention is to provide means for adjusting the brake which will leave the shoes contacting with the anchor, thus minimizing the likelihood of the click which occurs when the shoe is thrust against the anchor. One of the main features of the invention lies in the use of an anchor which may be turned to spread the shoes apart for the purpose of adjustment.

Another feature of the invention lies in the use of a spreader bar which co-acts with the two end portions of the brake shoe having sliding engagement with one which is especially shaped to secure gradual spreading.

Figures 1, 2:
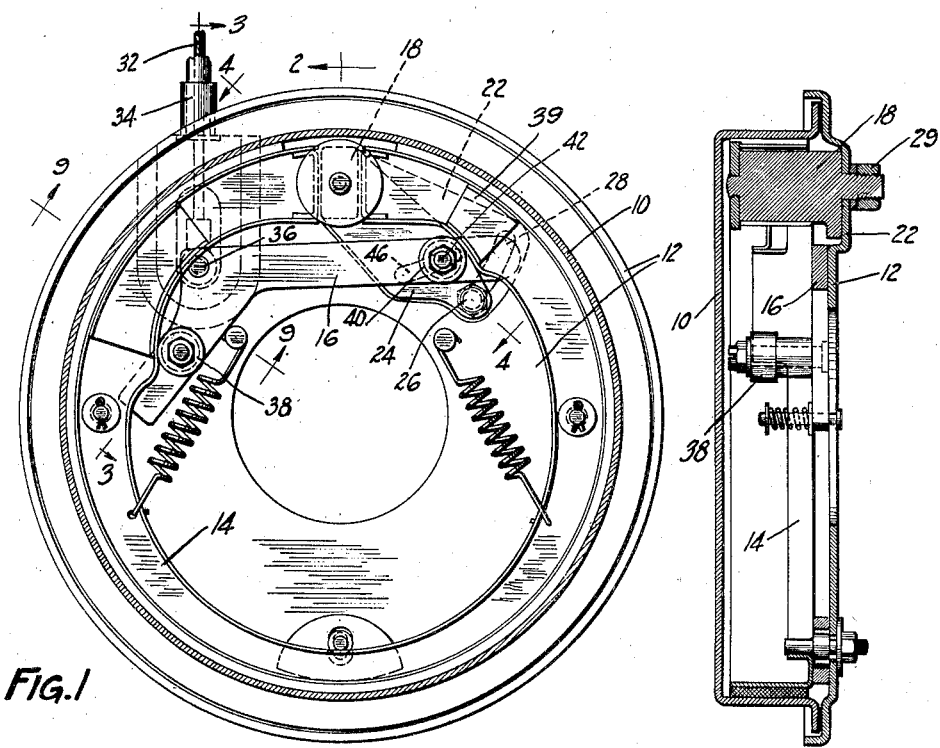
Figure 1 is a view showing one embodiment of the invention, some of the parts being shown in release and some in braking position for ease in illustration.
Figure 2 is a cross section along the line 2—2 of Figure 1.

A braking mechanism is supported within the brake drum 10 by the backing plate 12. As illustrated, it consists mainly of a single brake shoe 14 which is actuated by the spreader 16 and anchored by anchor 18. Suitable release springs, centering devices and steady rests may be used as illustrated. The backing plate 12 has an indentation 22 therein, in which is secured the anchor 18. Integral with or rigidly attached to the anchor 18 is an anchor adjustment plate 24 which lies in the indentation 22 and is adjustable therein, being secured in a given position by means of the nut and bolt 26 which slide in the slot 28 of the indentation in the backing plate. As this plate 24 is moved in the indentation, it rotates the anchor 18 about its axis, thereby spreading apart the ends of the shoe 14, thus adjusting the shoe for wear. The anchor may be further held in place by nut 29. It is clear that as this adjustment is made by the anchor, the shoes remain in contact therewith, thus minimizing the danger of clicking.

Figures 3, 4, 9:
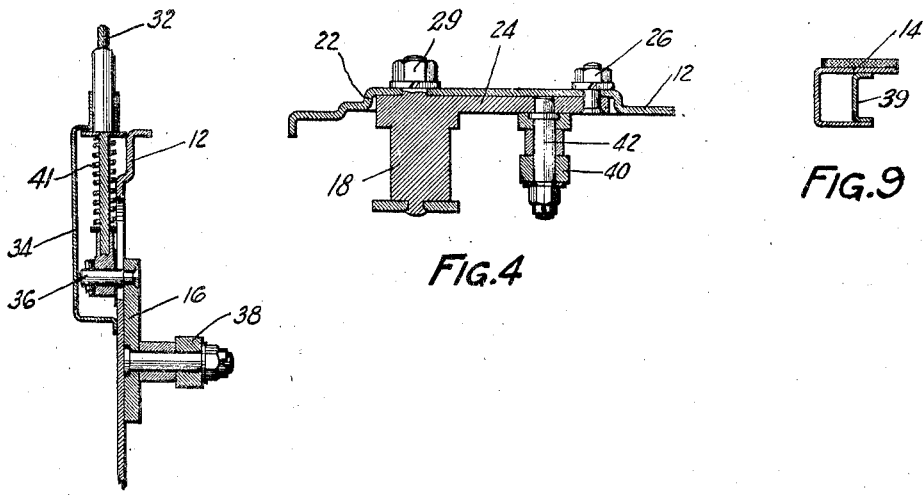
Figure 3 is a fragmentary cross section along the line 3—3 of Figure 1 showing the operating cable connection.
Figure 4 is a cross section along the line 4—4 of Figure 1.
Figure 9 is a cross section of the brake shoe along the line 9—9 of Figure 1.

The novel actuating mechanism is operated by a flexible cable 32 which extends into a housing 34 attached to the back of the backing plate 12. The cable is attached by the pivot 36 to the spreader bar 16 on which are pivoted actuating rollers 38 and 40 which co-act with the web near the two ends of the brake shoe which may be reinforced with a second web 39 if desired. Roller 40 is pivoted on a spindle 42 (Figure 4) which is extended to co-act with the slot 46 in the anchor adjustment plate 24. This slot and spindle direct the movement of the roller 40 so as to thrust the brake shoe against the drum, as shown. The operation of the brake is as follows: The cable 32 compressing spring 41 raises one end of the spreader bar 16, thus causing the rollers 38 and 40 to expand the brake shoe 14 against the drum 10, the braking torque being taken up by anchor 18.

When the lining has worn and adjustment is necessary, the nuts 26 and 29 are loosened and the anchor adjustment plate 24 is moved counter-clockwise, thus spreading the brake shoe the desired amount. Very little adjustment of the operating mechanism is necessary because the adjusting of the friction means merely slides another part of the web into contact with the rollers 38 and 40 so that the only take-up necessary is for the slight change in the thickness of the web and lining at the new points of contact of rollers with the web.

As has been explained above, the anchor remains in contact with the shoe after this adjustment, thus decreasing the danger of clicking.

Figure 5:
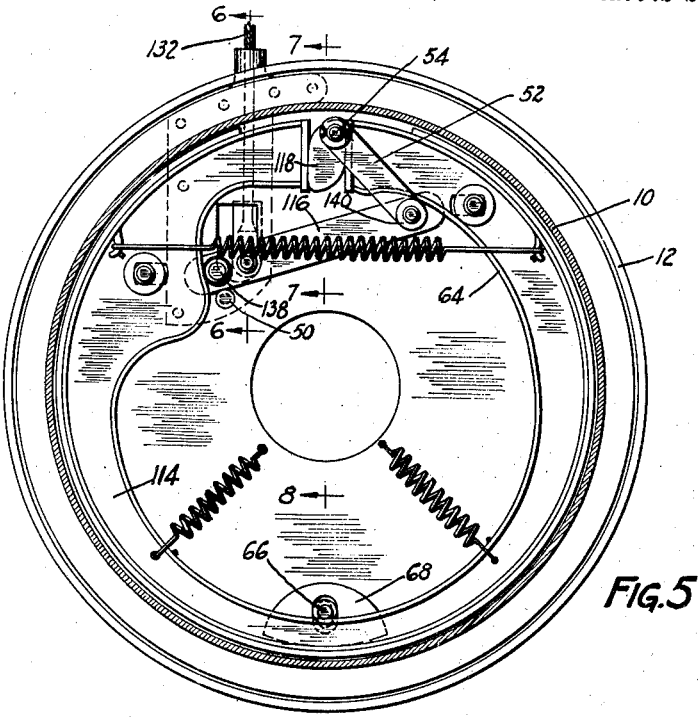
Figure 5 is a view of another embodiment of this invention.
Figure 6:
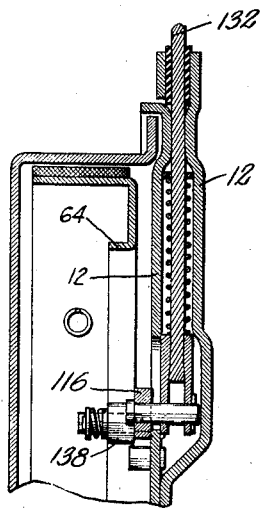
Figure 6 is a cross section along the line 6—6 of Figure 5.
Figure 7:
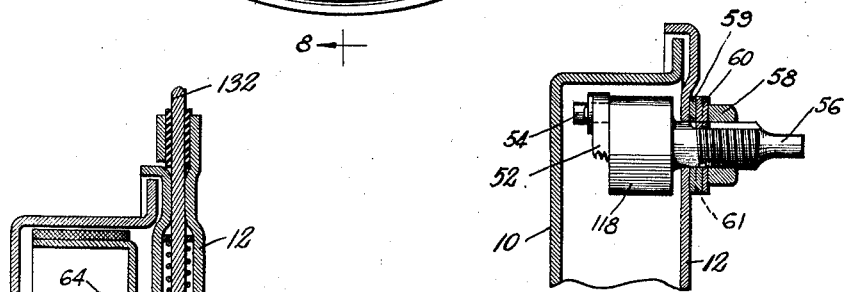
Figure 7 is a cross section along the line 7—7 of Figure 5.

The embodiment of Figure 5 is designed to make unnecessary any adjustment in the operating mechanism after adjustment of the shoe. In this embodiment, as in that shown in Figure 1, the cable 132 operates the spreader 116 and rollers 138 and 140. If desired, an eccentric 50 may be provided in either embodiment to limit the release movement of the spreader. Instead of the guide slot 46 I use in this embodiment the toggle 52 which at one end is pivoted to anchor 118 by a pin 54, and at the other is pivoted to the spindle of roller 140. Anchor 118 extends through the backing plate and has an adjustment head 56. As clearly shown in Figure 7, it is locked in the adjusted position by a nut 58 and the lock washer 60, which is keyed to the anchor shaft and has radial ribs 59 engaging ribs 61 rigidly secured to the backing plate.

When the brake is adjusted by turning the anchor 118 about its axis, the same movement raises roller 140 by means of toggle 52 to a wider portion 64' of the web of the brake shoe 114. Thus at the same time the shoe is spread apart in adjustment, roller 140 rides onto a higher part of the web, thrusting spreader 116 to the left. The shape of the web at 64 is such that the roller 138 will be shoved to the left just the amount that the co-acting part of shoe 114 recedes to the left. Thus the rollers 138 and 140 are kept constantly in contact with the shoe 114 as is the anchor 118. This eliminates both the necessity of taking up the slack in the cable 132 or its connections and the danger of clicking which would occur if shoe 114 were spaced from anchor 118.

Figure 8:
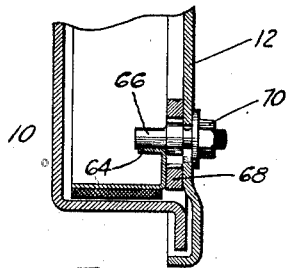
Figure 8 is a cross section along the line 8—8 of Figure 5.

Any suitable release springs and centering adjustments may be provided. One possible centering adjustment is illustrated in detail in Figure 8, in which 68 represents a spacer member attached to the backing plate, 66 is the centering device which extends through a large hole in the spacing member 68 and through a radial slot in the backing plate 12 and which is adapted to engage a portion of the web 64. The centering member is held in position by means of the nut 70. This centering device may, of course, be replaced by an eccentric.

While two illustrative embodiments of my invention have been described in detail, it is not my intention to limit the scope of the invention to those particular embodiments or otherwise than by the terms of the appended claims.

I claim:

1. Brake mechanism including friction means comprising a friction face and a web extending therefrom, actuating means co-acting with said web and moving relative to said web, said web being reinforced at the point of coaction with said actuating means, the web being so shaped that the relative movement thrusts the friction means circumferentially outward.

2. A brake including friction means, actuating means therefor, a toggle for restricting the movement of part of said actuating means, and means to operate said actuating means.

3. Brake mechanism including friction means, a backing plate, an anchor extending therethrough, said anchor having a projection extending along said backing plate, said projection having a slot therein, an actuating member having a projection extending into said slot, said actuating member co-acting with the two sides of the friction means to spread said friction means apart.

4. Brake mechanism including friction means, an anchor therefor, said anchor being rotatable and of such shape that its rotation will spread apart the ends of the friction means, said anchor having a projection lying along a backing plate and means for preventing movement between said projection and said backing plate, said projection having a slot therein and actuating means slidable in said slot to actuate the friction means.

5. Brake mechanism including friction means, actuating means therefor, means for adjusting said friction means and means for adjusting said actuating means, said actuator adjusting means being operated by said first-mentioned adjusting means.

6. Brake mechanism including friction means having a friction face and a web extending therefrom, a rotatable anchor contacting with two parts of said friction means and so shaped as to spread said parts upon being rotated, actuating means for said friction means and a connection between said anchor and said actuating means whereby adjustment of the anchor adjusts said actuating means.

7. Brake mechanism including friction means having a friction face and a web extending therefrom, actuating means extending between two parts of said web and means for moving both ends of said actuating means along said web, said web varying in width along the path of said motion and thereby having wedging spreading engagement with said actuating means.

8. Brake mechanism including friction means having a friction face and a web extending therefrom, a rotatable anchor pin between two parts of said friction means, an actuating bar between two parts of said web, a connection between said anchor and said bar whereby rotation of said anchor moves said bar, the web being so shaped that the movement of said actuating bar substantially compensates for the movement of said friction means during a given rotation of said anchor.

9. Brake mechanism including a backing plate, friction means and actuating means therefor comprising a spreader bar in engagement with said friction means on one side of the backing plate and a cable on the other side.

10. Brake mechanism including friction means, supporting means, actuating means consisting of a spreader bar movable along two parts of the friction means, the friction means being of such shape that said movement thrusts the spreader toward another part of the friction means.

11. Brake mechanism including friction means, supporting means, actuating means consisting of a spreader bar movable along one part of the friction means, the friction means being of such shape that said movement thrusts the spreader toward another part of the friction means, the other end of said spreader being guided by a slot in said supporting means.

12. A brake including a drum, friction means, actuating means engaging the inside of said friction means, said friction means being movable in contact with said actuating means to make adjustments for wear, and said friction means being so shaped as to retain the actuating means at least as far from the adjacent drum rim after the adjusting movement for wear as before.

13. A brake including a drum, friction means, actuating means engaging the inside of said friction means, said friction means being movable in contact with said actuating means to make adjustments for wear, and said friction means being so shaped as to force the actuating means further from the adjacent drum rim during adjustment of said friction means for wear.

14. A brake mechanism comprising friction means having spreadable ends, an anchor located therebetween, a rigid anchor support, said anchor extending through said anchor support and being of such shape that rotation thereof may spread said ends, and a washer keyed to said anchor and to said support and adapted to hold said anchor against rotation.

15. A brake mechanism comprising friction means having spreadable ends, an anchor located therebetween, a rigid anchor support, said anchor extending through said support and being of such shape that rotation thereof may spread said ends, a washer keyed to said anchor and to said support, actuating means for said brake, and compensating means including a link eccentrically pivoted to said anchor adapted to compensate said actuating means for rotation of said anchor.

16. A brake mechanism comprising friction means having spreadable ends, an anchor therefor, said anchor being rotatable and of such shape that its rotation will spread apart the ends of the friction means for adjustment, actuating means for spreading the ends independent of said anchor, and compensating means to maintain substantially normal movement of said actuating means, throughout the range of adjustment of said rotatable anchor and the resultant spreading of said ends.

GEORGE F. HOUSTON.